UNITED STATES PATENT OFFICE.

CARLETON ELLIS, OF MONTCLAIR, NEW JERSEY, ASSIGNOR TO NEW JERSEY TESTING LABORATORIES, A CORPORATION OF NEW JERSEY.

CONCRETE-WATERPROOFING COMPOSITION.

1,077,689.  Specification of Letters Patent.  Patented Nov. 4, 1913.

No Drawing.  Application filed February 3, 1912. Serial No. 675,216.

*To all whom it may concern:*

Be it known that I, CARLETON ELLIS, a citizen of the United States, and a resident of Montclair, in the county of Essex and State of New Jersey, have invented certain new and useful Improvements in Concrete-Waterproofing Compositions, of which the following is a specification.

This invention relates to a composition for waterproofing cement and concrete and relates in particular to compositions comprising the insoluble salts of naphthenic acids and the like, all as more fully set forth hereinafter, and as claimed.

It has been customary heretofore to waterproof concrete by means of additions to the mortar or dry cement of such waterproofing agents as petroleum oil, water soluble soaps, clay, hydrated lime, alum, stearate of lime, resinates and the like. Each of these has certain advantages and disadvantages.

The present invention has for its object the production of a composition which is an effective waterproofing agent and is at the same time stable even under severe service conditions, or which carries a corrective in case hydrolysis in slight measure sets in under unusual or disintegrating conditions.

My invention relates especially to the use of the acid sludge or acid oil waste of petroleum refineries, including the various sulfonic, sulfinic and other acid bodies, which are chemically and physically quite different from the class of bodies known as the fatty acids. The naphthenic acids, under which term these various sulfo-acids and oxidized acids are herein comprised and denominated form the main organic acid constituents of acid sludge. Other constituents of the sludge are unchanged or slightly changed oily matter and sulfurous acid; although the sludge varies with different localities and with different oils so that each lot of the sludge should be tested for composition prior to using as described herein. The sludge from light oils such as kerosene and naphthas may be used for certain purposes but preferably I employ that derived from the refining of the heavier oils, as these generally speaking have a more pronounced waterproofing effect.

In preparing the compositions set forth herein I usually first separate as far as possible the water and sulfurous acid which may be present and I then neutralize or partially neutralize the organic acid bodies with a base which forms an insoluble compound. Practically I overneutralize the acid, that is, add an excess of the basic material so that the resulting composition is essentially basic and carries the basic salts of the acids referred to. This yields a compound which is better adapted for the present purpose than a strictly neutral salt. It is however usually undesirable to introduce any great excess of the basic element but rather, if filling or extending materials are required to use such bodies as talc or fullers' earth and the like. Portland cement is a useful extending material to assist in securing a desirable degree of pulverulency, and in fact cement may be used as a neutralizing agent. Suitable bases for neutralizing the acid sludge are the oxids (or other basic compounds) of barium, magnesium, calcium, aluminum, iron, lead, zinc and the like. Preferably a composite body derived by neutralizing with burnt dolomite which gives the lime-magnesia compound of acid sludge is used. Preferably also a set adjusting and corrective body tending to prevent or retard hydrolysis under normally disintegrating conditions is introduced. For a composition intended to be used in a pulverulent form, a corrective which is non-hygroscopic is employed. The class of correctives includes such soluble salts or bodies as barium chlorid, sodium thiosulfate, basic magnesium acetate and to a certain limited extent common salt. Barium chlorid and other soluble barium salts are however preferred.

An illustrative formula is the following:—One part of acid sludge, one half part of hydrated lime and three parts of Portland cement are mixed and heated to about 200° C. until reaction is complete, which requires only a few minutes' heating. This composition is ground and bolted if necessary, and one eighth part of finely ground barium chlorid is then added. Another composition is made from one part of acid sludge, one part of dolomite (calcined)

and three parts of fullers' earth. By wet precipitation with an alum solution the aluminum salts may be obtained, the acid sludge being first neutralized with sodium carbonate or hydroxid. In conjunction with the compounds of these peculiar sludge acids other waterproofing bodies may be used if desired, including water soluble soaps and the water insoluble soaps of the fatty acids. The following formula illustrates the combination of a naphthenic acid compound with a fatty acid compound;—to wit:—Three parts of barium naphthenate are mixed with one part of lime stearate and one fourth part of sodium chlorid; two parts of finely ground talc are then added. Or equal parts of acid sludge and stearic acid are mixed with a like weight of hydrated lime and of levigated carbonate of lime. The mixture is heated to about 200° C. or thereabout with constant stirring to give a pulverulent product. This is incorporated while still warm with about 10% of dry powdered sodium aluminum sulfate. Such mixtures containing both the salts of the naphthenic and stearic acid, oleic acid or like body are useful with certain cement aggregates and especially with white Portland cement. When stearic acid or similar fatty acid is combined in this manner with lime in the presence of the naphthenic acid apparently a complex is derived which incorporates more readily in the mortar than the compounds taken singly. This often is desirable especially in the case of some mortar mixtures in which a simple lime soap such as lime stearate segregates from the wet mixture to a considerable extent. The method of forming the basic bodies in the presence of filling and weighting material, causes, in a large measure, the attachment of the waterproofing compounds to the filling material, from which they are not readily dislodged by the action of the water in making mortar; hence each of the particles may be thus weighted with a particle of heavier material which also tends to prevent undesirable flotation. A further addition to such compositions, which may be made for some purposes, is an asphaltic body; also asphaltic oils, tar, pitches such as candle pitch or tar and the like. These additions are of course usually undesirable in white or very light colored cements, but for the darker grades have some utility in certain directions. Preferably a miscible form of the asphaltic or similar body should be employed. This condition of miscibility may be secured with some asphaltic stock merely by the incorporation of a quantity of hydrated lime. Uusually however the addition of an alkali or better a water soluble soap is required. Potassium oleate or resinate or mixtures of these incorporate readily with alphaltic oils and other asphaltic bodies, especially in the presence of a moderate amount of pine oil or cresylic acid. These asphaltic or tarry additions are employed to good advantage when the concrete is to be subjected to the action of a steamy atmosphere for prolonged periods. 10% to 20% of the miscible asphalt usually suffices for this purpose.

The acid sludge employed herein is practically a waste product and the present invention offers a field of usefulness for this waste material, lending to the cheapening of the cost of materials for concrete waterproofing. The waterproofing of so bulky a material as concrete with expensive agents such as stearic acid or stearate of lime, although only a small percentage of the waterproofer may be called for, becomes a very large and disproportionate item of expense in the construction of large buildings and the like; and the utilization of a discarded or waste material for the same purpose, accomplishing the same end although functioning in a different way, permits of cheaper constructional cost.

A formula illustrative of the specific embodiment herein claimed is as follows:— Three parts of lime-neutralized artificial acid sludge, one part of asphaltic oil, one part of stearate of lime, ¼ part each of barium chlorid and sodium chlorid, and six parts of Portland cement are well incorporated to produce a pulverulent composition.

It should be understood that besides the sludge material derived from the treatment of oils with acid, the bodies extracted by treatment with alkali may likewise be used. These may be obtained in a sufficiently pure form by salting out the lye resulting from alkali purification, or in some cases, salting out is not necessary. The lye composition from light oils as a rule contains less free oil than that from heavy oils, and when only a small proportion of free oil is required in the waterproofing composition the light oil naphthenates preferably are used.

To recapitulate: My invention relates to a waterproofing composition comprising neutralized acid sludge and the like carrying lime or other base in combination and the particular advantage of such a waterproofing composition is that the presence of the sulfur-containing radical serves to make the naphthenic acid stronger, as it were, so that its affinity for lime or other base is pronounced and this quality tends to reduce hydrolysis and to give the material greater resistance to the action of mildly acid water such for example as is produced from the decay of humus.

What I claim is:—

1. A waterproofing composition adapted for concrete comprising neutralized acid sludge carrying an alkali-earth base in combination.

2. A waterproofing composition comprising overneutralized acid sludge carrying lime in combination, admixed with pulverulent material.

Signed at Montclair in the county of Essex and State of New Jersey this 6th day of January A. D. 1912.

CARLETON ELLIS.

Witnesses:
BIRDELLA M. ELLIS,
W. C. BLADEN.